US008656224B2

(12) United States Patent
Duchenay et al.

(10) Patent No.: US 8,656,224 B2
(45) Date of Patent: *Feb. 18, 2014

(54) NETWORK FAULT MANAGEMENT IN BUSY PERIODS

(75) Inventors: William Duchenay, Cork (IE); Thierry P. R. Supplisson, Cork (IE); Eric Thiebaut-George, Cork (IE)

(73) Assignee: International Business Machines Corporation, Armonk, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/216,056

(22) Filed: Aug. 23, 2011

(65) Prior Publication Data

US 2012/0066558 A1    Mar. 15, 2012

(51) Int. Cl.
*G06F 11/00* (2006.01)
(52) U.S. Cl.
USPC ........... 714/47.1; 714/47.2; 714/47.3; 714/57
(58) Field of Classification Search
USPC ........ 714/25, 27, 39, 45, 47.1, 47.2, 47.3, 48, 714/57
See application file for complete search history.

(56) References Cited

U.S. PATENT DOCUMENTS 5,388,189 A    2/1995  Kung
6,678,245 B1 *  1/2004  Cooper et al. ................ 370/230
7,349,960 B1 *  3/2008  Pothier et al. ................ 709/224
2005/0198247 A1 *  9/2005  Perry et al. .................... 709/223
2008/0144488 A1    6/2008  Tuulos et al.
2010/0017508 A1    1/2010  Donadio et al.
2010/0036810 A1 *  2/2010  Wu et al. ........................ 707/3

OTHER PUBLICATIONS

Duchenay et al., U.S. Appl. No. 13/445,568, filed Apr. 12, 2012, 27 pages.
Notice of allowance dated Oct. 2, 2013 regarding U.S. Appl. No. 13/445,568, 6 pages.
Non-final office action dated Aug. 1, 2013 regarding U.S. Appl. No. 13/445,568, 16 pages.

* cited by examiner

*Primary Examiner* — Joseph D Manoskey
(74) *Attorney, Agent, or Firm* — Yee & Associates, P.C.; Libby Z. Toub

(57) ABSTRACT

A set of connected network devices and at least one network device generate an event record containing an identity of the generating network device and a timestamp indicating when the event was generated. The event record is retrieved that identifies the network device that generated the event. A key period of use associated with the generating network device is also retrieved. If the time of the event is within the retrieved key period, the event record is modified to show that the event is within the retrieved key period. Using information in the modified event record, the event and an indication that the event is within the retrieved key period is displayed.

18 Claims, 8 Drawing Sheets

| Event | Event Time | Key Period Identification | Cell Id | Key Period Time |
|---|---|---|---|---|
| 1 | 00:01 | BusyHour1 | Cell1 | 00:00/00:59 |
| 2 | 00:03 | BusyHour1 | Cell1 | 00:00/00:59 |
| 3 | 00:07 | - | Cell2 | - |
| 4 | 00:19 | BusyHour1 | Cell1 | 00:00/00:59 |
| 5 | 00:28 | - | Cell3 | - |
| 6 | 00:45 | BusyHour1 | Cell1 | 00:00/00:59 |
| 7 | 01:01 | PostBusyHour2 | Cell1 | 01:00/01:59 |
| 8 | 01:37 | PreBusyHour3 | Cell2 | 01:00/01:59 |
| 9 | 02:05 | BusyHour4 | Cell2 | 02:00/02:59 |
| 10 | 02:10 | - | Cell3 | - |
| 11 | 02:19 | BusyHour4 | Cell2 | 02:00/02:59 |

| Grid Key | |
|---|---|
| Border Type | Key Period Type |
|  | Dotted | Post-Busy-Hour |
|  | Dashed | Pre-Busy-Hour |
|  | Solid | Busy Hour | dow
NETWORK FAULT MANAGEMENT IN BUSY PERIODS

BACKGROUND

This invention relates to a method and apparatus for network fault management in busy periods.

When a fault occurs in a network it can be difficult for administrators and management to understand the relevant network conditions at the moment of the fault because of the large numbers of factors that are involved. For instance, each network device has multiple hierarchical relationships with other network devices and all the relationships are potentially relevant to the fault. Furthermore each point in the network has potentially a different set of network conditions. Analysis of a single fault by a fault management system can take input from tens or hundreds or more factors and this approach has limitations when scaled further.

Network performance management systems evaluate large numbers of complex network conditions by consolidating network events and by interrogating network devices directly for performance factors. Network performance management systems use consolidated indicators and directly acquired performance factors to calculate critical periods corresponding to maximum demand on a network or clusters of devices within a network. Typically network performance management takes a macro or top down approach to network management whereas fault management takes a micro or bottom up approach. Network performance management is concerned with maximising the efficient throughput of network traffic whereas network fault management is concerned with understanding which individual events are relevant to problems in the network. Therefore, there is a need in the art to address the aforementioned problem.

SUMMARY OF INVENTION

According to one embodiment of the present invention, a set of connected network devices and at least one network device generate an event record containing an identity of the generating network device and a timestamp indicating when the event was generated. The event record is retrieved that identifies the network device that generated the event. A key period of use associated with the generating network device is also retrieved. If the time of the event is within the retrieved key period, the event record is modified to show that the event is within the retrieved key period. Using information in the modified event record, the event and an indication that the event is within the retrieved key period is displayed.

DESCRIPTION OF DRAWINGS

Embodiments of the invention will now be described, by means of example only, with reference to the accompanying drawings in which:

FIG. 6 is an example set of enriched event data assembled by the present embodiment;

DESCRIPTION OF THE EMBODIMENTS

Figure 1:
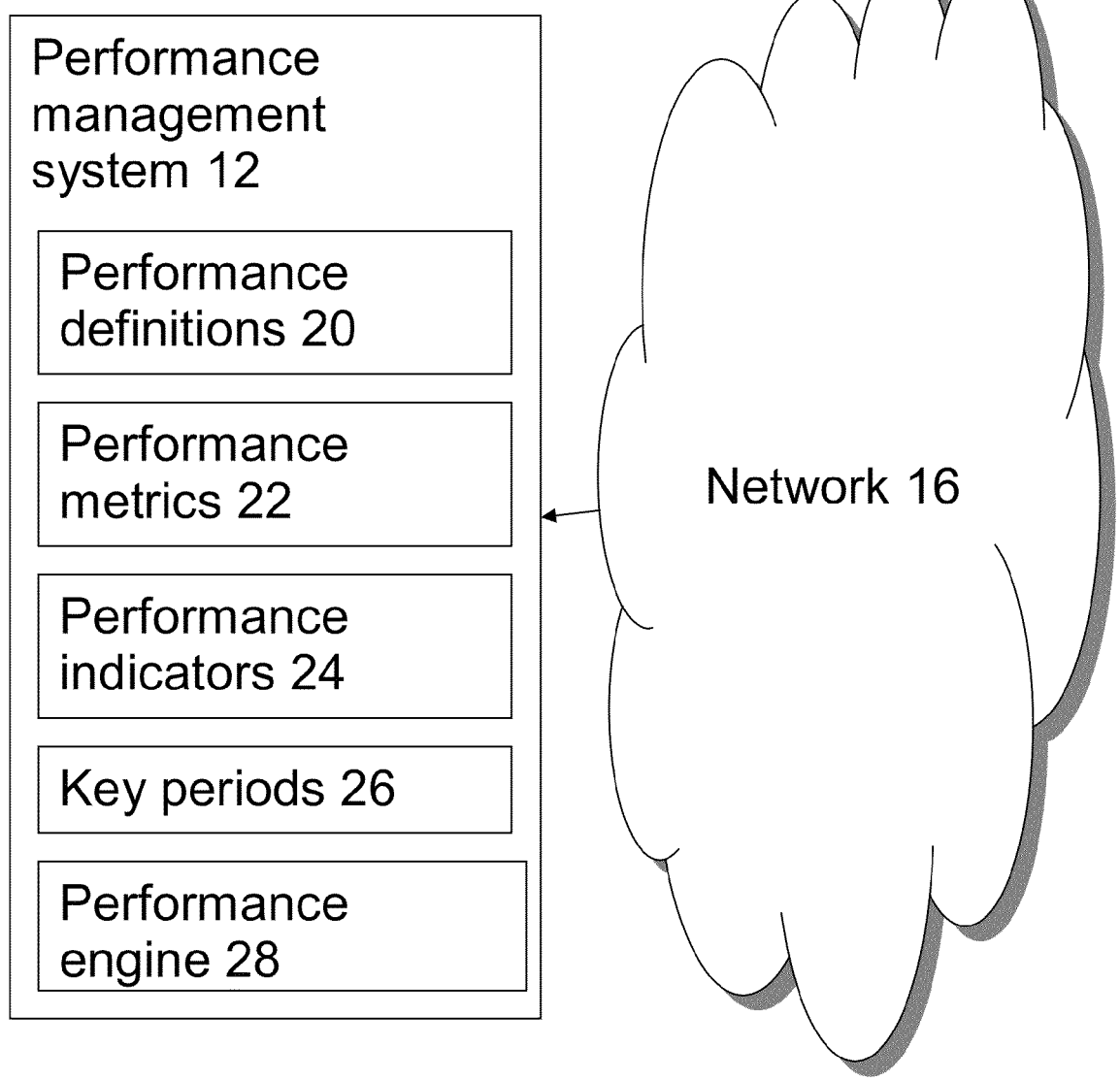
FIG. 1 is a component diagram of a performance management system according to the prior art.

Referring to FIG. 1, a prior art performance management system 12 connected to network 16 comprises the following components: performance definitions 20; performance metrics 22; performance indicators 24; key periods 26; and performance engine 28.

Performance definitions 20 are definitions used by the performance engine 28 for performance analysis. Normally the performance definitions are set by a network administrator. One performance definition defines the particular network devices that make up clusters of network devices; network devices and clusters of network devices are collectively referred to as network cells. Use of the term cell here is particular to the description.

Performance metrics 22 comprise raw performance data acquired from the network devices by the performance engine 28 using performance definitions 20. The metrics might be functions of events collected from network devices or performance data acquired by directly querying the network devices.

Figure 2:
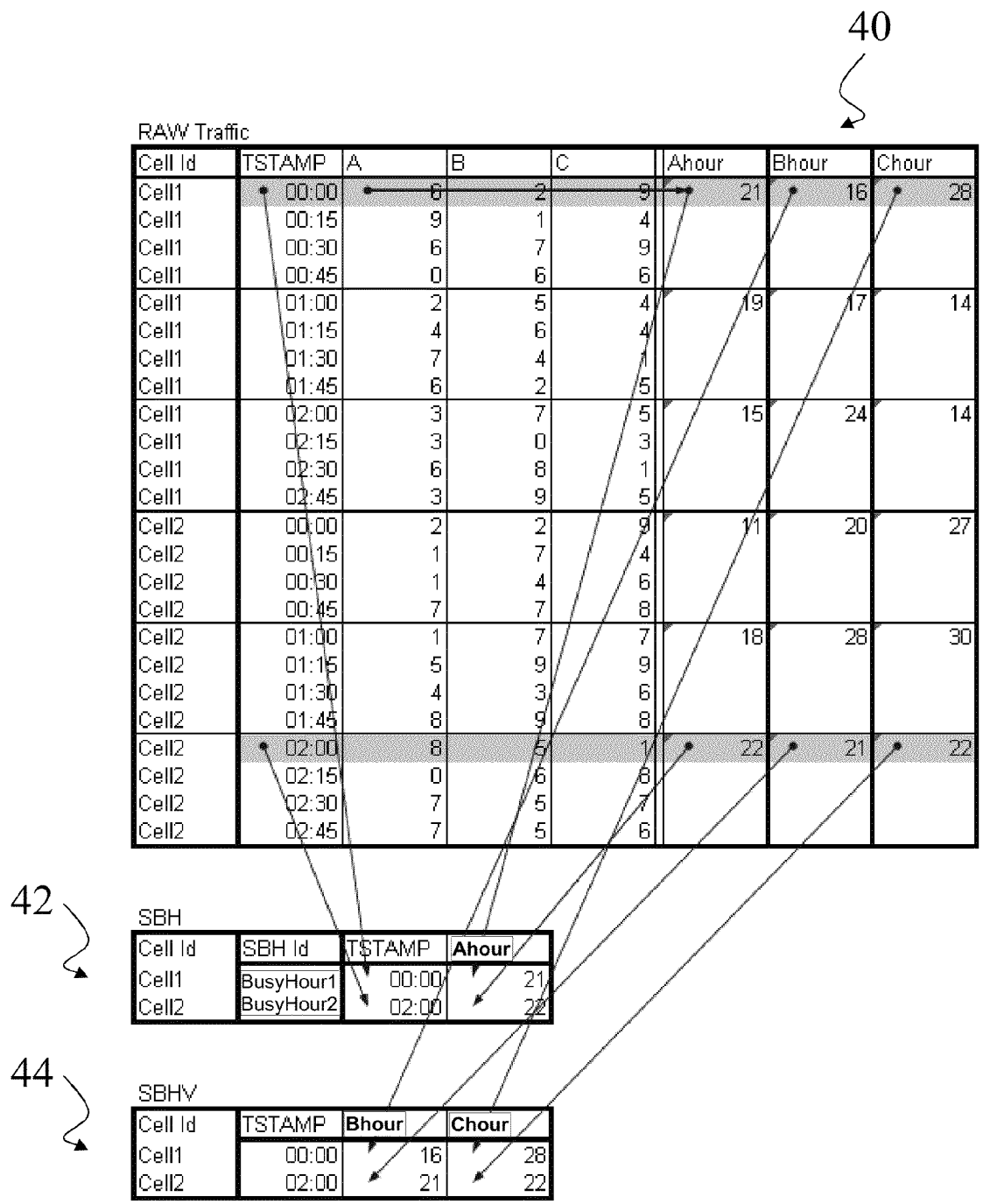
FIG. 2 is an example set of performance data collected by the performance management system of FIG. 1.

Performance indicators 24 are calculated, for network devices and network clusters, from performance metrics 22 using performance definitions 20. For example, the performance definitions 20 could define a performance indicator 24 as a function of the consolidated performance metrics of a single device over a particular period of time. Furthermore, the performance definitions 20 could define that a network device has a performance indicator depending on the consolidated performance metrics of a cluster of network devices. In the example of FIG. 2, performance metrics 22 and performance indicators 24 are in separate columns in table 40.

Key periods 26 are calculated from the performance indicators 24 and performance metrics 22 using the performance definitions 20. Performance definitions 20 define that a network device has a key period depending on the consolidated performance indicators of a cluster of network devices. In the example of FIG. 2, key periods BusyHour1 and BusyHour2 are shown in a column labelled SBH ID in table 42.

Performance engine 28 uses the performance definitions 20 to collect raw performance data from network 16. Performance engine 28 further uses the performance definitions 20 to operate on the raw performance metrics 22 and calculate performance indicators 24. Performance engine 28 then uses the performance definitions 20 to calculate the key periods 26.

An example of how key periods are calculated is described with respect to FIG. 2. Table 40 contains data relating to network devices and clusters corresponding to performance metrics 22 and performance indicators 24. The first column, labelled Cell Id, contains cell identification corresponding to a network device or a cluster of devices. The second column, labelled TSTAMP, contains the time when the performance metrics are acquired from the network device or calculated for the network cluster. The third, fourth and fifth columns, representing performance metrics 22, are labelled A, B and C respectively. The sixth, seventh and eighth columns, representing performance indicators, are labelled Ahour, Bhour and Chour and are calculated from the performance metrics in columns A, B and C. In this example Ahour, Bhour, Chour are the sums of the performance metrics A, B, and C respectively and the busy hour is defined when taken as Ahour is a maximum. The biggest value of Ahour is 21 summed from 6, 9, and 6 in column A and indicated by a horizontal arrow.

FIG. 2 table 42 shows example key periods 26 for device cell Cell1 and Cell2 labelled BusyHour1 and BusyHour2 respectively in column SBH Id. BusyHour1 and BusyHour2 correspond to the hour after 00:00 and 02:00 for Cell1 and Cell2 respectively. Performance definitions 20 define that the key periods for both Cell1 and Cell2 are calculated from when performance indicator Ahour is a maximum. In the example, for Cell1 key indicator Ahour is at a maximum of 21 in the period starting at 00:00 (see corresponding cells in table 40 and table 42). For Cell2 key indicator Ahour is at a maximum of 22 in the key period starting at 02:00. Table 44 shows other performance indicators, Bhour and Chour, in the key periods.

Figure 3:
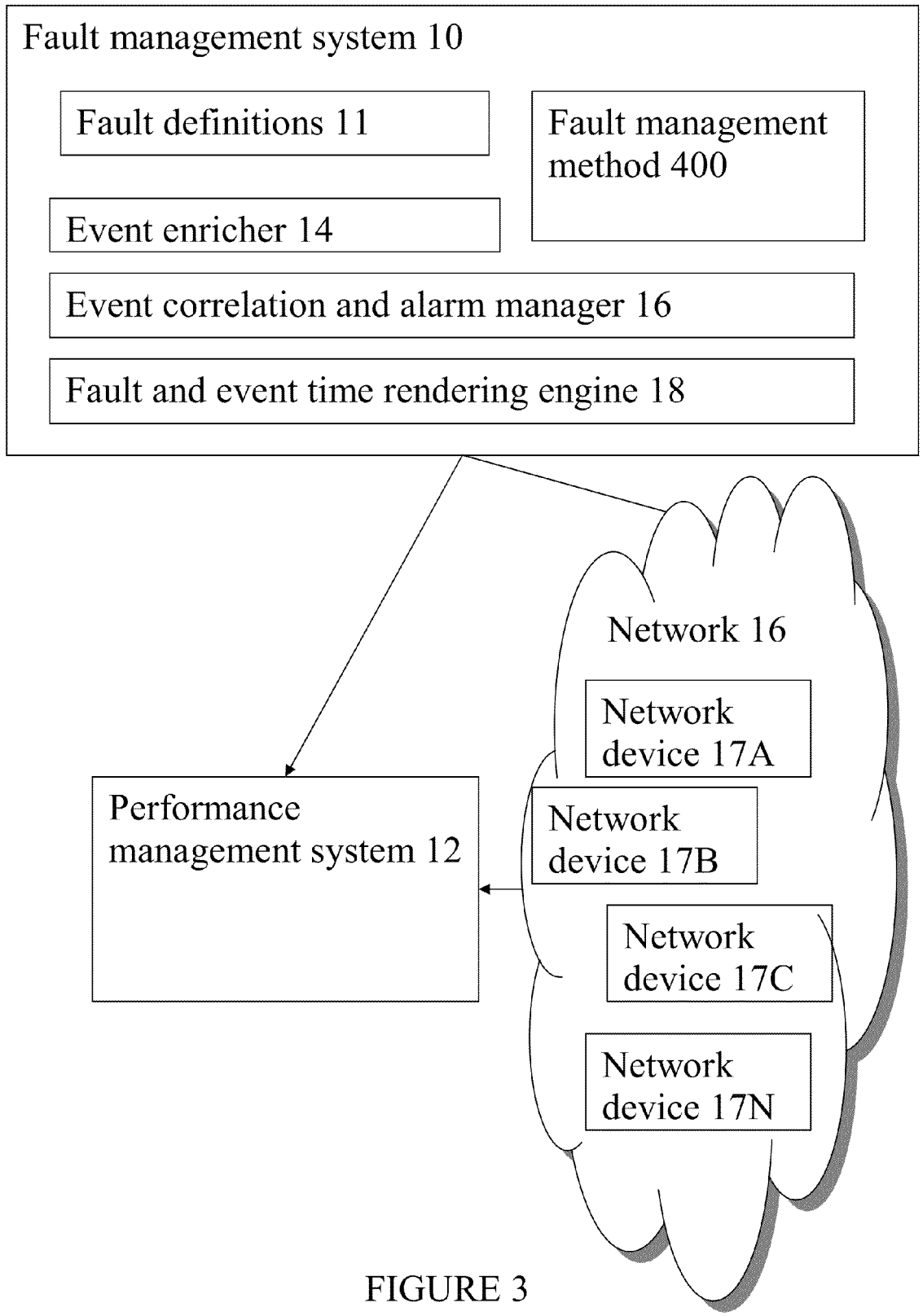
FIG. 3 is a component diagram of a fault management system and performance manager system of the preferred embodiment.

The preferred embodiment of the invention, as shown in FIG. 3, comprises a fault management system 10 connected to a performance management system 12. Performance management system 12 is known and similar to the one described with respect to FIG. 1. Both the fault management system 10 and the performance management system 12 are connected independently to network 16 of network devices 17A to 17N. Fault management system 10 comprises the following components: fault definitions 11; event enricher 14; event correlation and alarm manager 16; fault and event time rendering engine 18; and fault management method 400.

Figure 4:
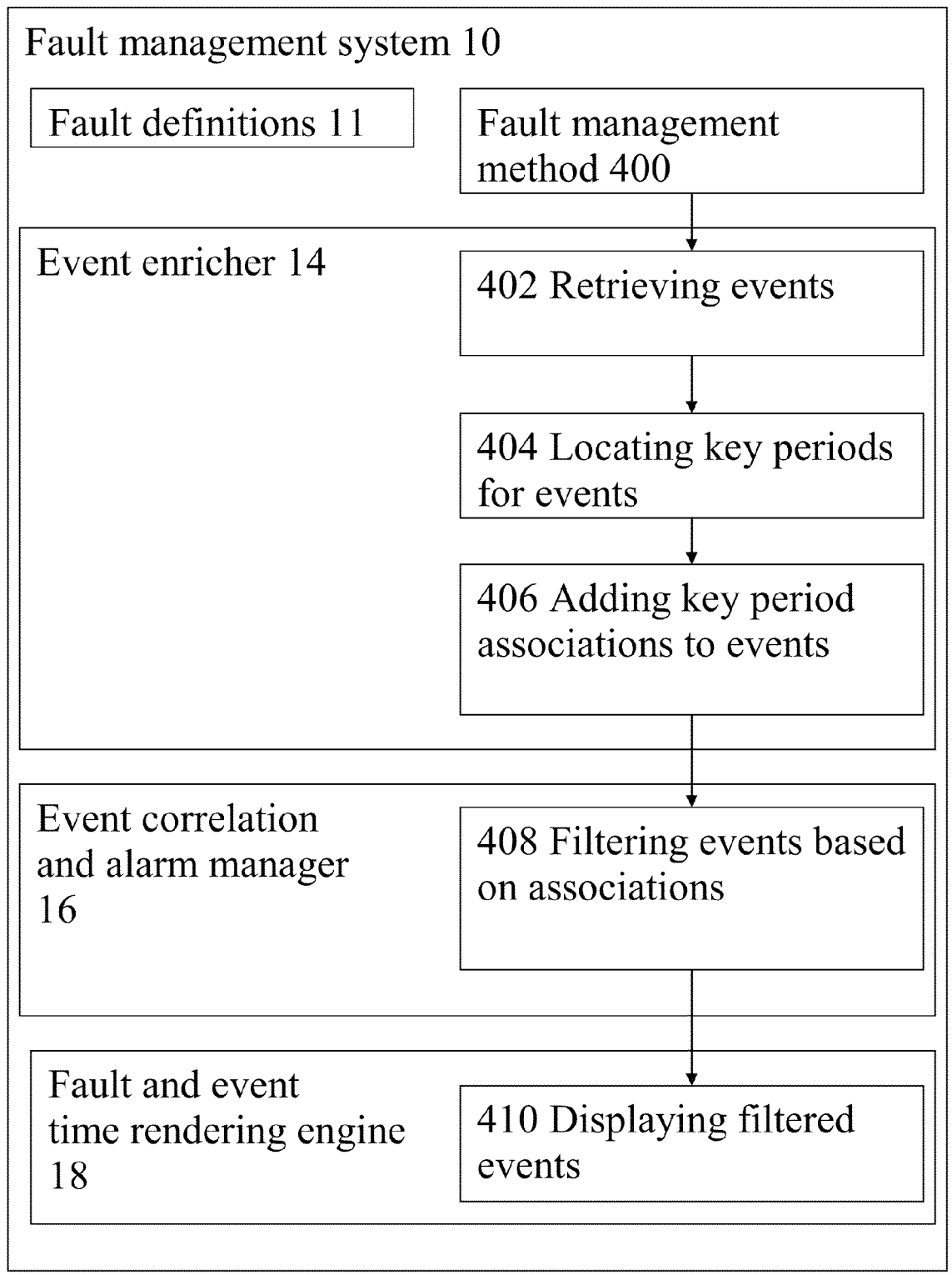
FIG. 4 is a component diagram of the fault management system of FIG. 3 including a flow diagram of method steps for event enrichment, filtering and display.

Fault management system 10 is described in more detail with respect to FIG. 4 and fault management method 400. Fault management method 400 comprises the following method steps: step 402 retrieving events; step 404 locating key periods for events; step 406 adding key period associations to events; step 408 filtering events based on associations; and step 410 displaying filtered events. In the preferred embodiment fault management method 400 is divided into three parts associated with the three components of fault management system 12 but in other embodiments the components and division of method may be different.

Fault definitions 11 comprise all the definitions needed by the fault management system and used in the fault analysis.

Event enricher 14 performs steps 402, 404 and 406 of the fault management method 400.

Step 402 comprises retrieving event records from event correlation and alarm manager 16.

Step 404 comprises, following the event record retrieval, locating key period information corresponding to the device that generated the record event from the performance management system 12. Further details for locating the key period information are described with respect to FIG. 5. Once the key period or key periods have been located, fault management method 400 continues at step 406 below.

Step 406 comprises modifying the event records by adding key period information to the relevant record.

Event correlation and alarm manager 16 retrieves event data from the network devices and makes them available to the event enricher 14 for modification and addition of key period information. The event correlation and alarm manager 16 performs step 408 of the fault management method 400.

Step 408 comprises filtering events based on the added associations with the key periods. An example set of enriched event data filtered based on the added associations with key periods is shown in FIG. 6.

Fault and event time rendering engine 18 performs step 410 of the fault management method 400. In a prior art fault management system the event data is presented to the user without any association to key periods in the performance of the relevant network devices.

Figure 7:
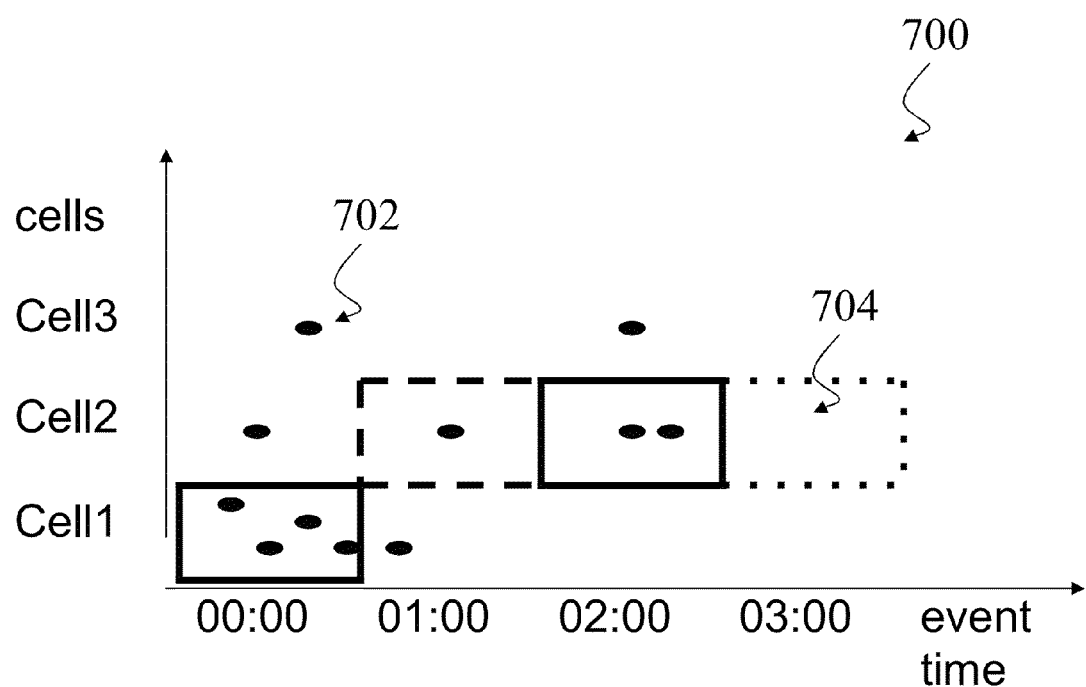
FIG. 7 is an example of visualised enriched event data rendered by the present embodiment.

Step 410 comprises rendering event data together with graphical representations of relevant key periods. FIG. 7 is an example of visualised enriched event data and graphical representation of the relevant key periods.

Figure 5:
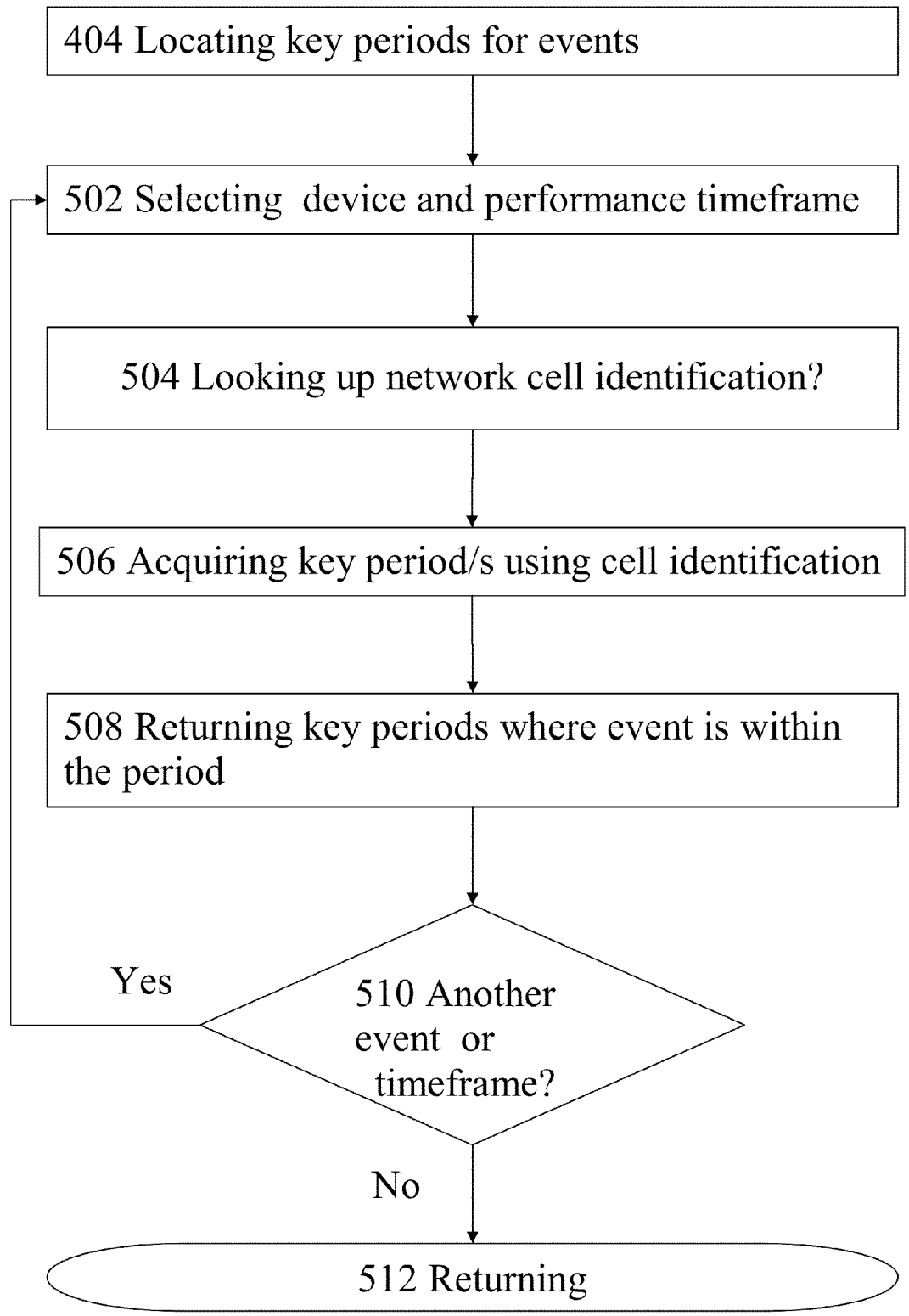
FIG. 5 is a flow diagram of a method step from FIG. 4 for locating key periods for event data.

The further details of step 404 are described with reference to FIG. 5. Step 404 further comprises sub-steps 502 to 514 performed by event enricher 14.

Step 502 comprises a loop step for selecting a device and a timeframe for analysis. A timeframe is a period containing the key periods that a user wants to test against the events; and a user may set more than one timeframe in the fault definitions. For each event retrieved in previous step 402, a device is identified from fault definitions 11 and step 502 starts with the first device and first timeframe. At each loop of step 502 the next event is considered and the next device is selected. If all the events have been selected then a new timeframe is selected and step 502 starts again with the first event. For instance, the period of event analysis could be taken from a particular day and the performance timeframe can be the same day or another day. The event period can be a week or month or longer and the same length of period can be defined for the performance timeframe. Therefore more than one timeframe can be considered in the same fault analysis and each new timeframe is selected and considered at step 502.

Step 504 comprises locating the corresponding network cell used in the performance management system by looking up the network device in fault definitions 11. Fault definitions 11 includes the same or a similar map of network devices to corresponding network cells (network devices or network clusters) used in the performance management system. For example, network device 17A might have key periods calculated for only network device 17A but is still identified by Cell1 in the performance management system. In another example, network device 17B might have key periods calculated for performance data from network device 17B, 17C and 17D; in this case any of devices 17B, 17C, 17D will be identified by Cell2 in the performance management system. In another embodiment the lookup step might access the performance management definitions directly.

Step 506 comprises acquiring one or more key period records from key periods 26 using the cell identification and the selected time. FIG. 2 shows Cell1 and Cell2 with single key periods (BusyHour1 and BusyHour2 respectively) but each cell can be associated with more than one key period in this table. The key period record includes the type of key period and the key period time. One key period might be a busy hour period and other key periods might be a pre-busy-hour; post-busy-hour; or foreign-busy-hour.

Step 508 comprises returning the key period record to step 404 when the event time is within the key period time.

Step 510 comprises determining if there is another event to process or if there is another timeframe to process and if so returning to step 502.

Step 512 comprises returning control to step 404.

An example of enriched event data rendered by the present embodiment is shown in FIG. 6 and described as follows. Table 600 comprises a list of events records 1 to 11, the events occur at time 00:01; 00:03; 00:07; 00:19; 00:28; 00:45; 01:01; 01:37; 02:05; 02:10 and 02:19 respectively. The first column comprises the event identity and the second column comprises the time of the event. The third, fourth and fifth columns comprise the enriched information added by the fault management system. The third column comprises the type and identification of the key period (or key periods in some cases but not shown here); the fourth column comprises the cell identity corresponding to the network device that generated the event; and the fifth column comprises the key period time. The key period time column is optional since the key period times can be stored in a separate more compact form to save memory or can be retrieved directly from the performance management system. The collection of event times, key period labels and key period times allow filtering and transforming into a visual representation of event and key periods of FIG. 7. Where there is no key period for an event or cell then a dash (-) in the key period columns represents a null value.

FIG. 7 shows a grid 700 plotting events 702 in time along the horizontal axis and cells in the vertial axis. Event time spans from 00:00 minutes to 3:00 minutes along the horizontal axis and the cells comprise Cell1, Cell2 and Cell3 along the vertical axis. By using the enriched event information of table 600, the present embodiment can group events by cell and then plot the grouped events in a corresponding cell column The preferred embodiment can indicate key periods on a graph using bordered areas in grid 700. For example, area 704 has a dotted border indicating that it represents a key period. Different types of key period are indicated using different types of borders, for example, with solid, dashed and dotted borders.

Figure 8:
FIG. 8 is a key to the visualised enriched data of FIG. 7.
Figure 8:
Figure 8:

FIG. 8 table 706 is a key to the visualised enriched data of FIG. 7 mapping the types of key period and the type of borders 704 as described above. In tables 700 and 706, busy hour key periods are shown by a solid line border; pre-busy-hour key periods are shown by dashed line border; and post-busy-hour key periods are shown by dotted border.

OTHER EMBODIMENTS

In the present embodiment, the key periods are described calculated with respect to the generating network devices or group of network devices but in other examples, the key period could be associated with another device related to the generating device including a managing agent. The managing agent could be another physical network device or element in charge of managing the generating device. The managing agent could also be a logical element such as agent software on a physical device.

In another embodiment, the performance management system raises events related to some network elements, for example, when the performance management system detects a "threshold violation" during high latency or high CPU usage.

In the preferred embodiment groups of network device has been described as network cells using wireless vocabulary; however, other embodiments are not limited to the wireless domain and any network device or IT resource and configuration of groups of device and resources can be used.

In the preferred embodiment the network management system is described as separate fault management and performance management systems that are tightly integrated. In another embodiment the invention may be embodied in a single fault management system with the claimed features of the performance management system fully integrated. In another embodiment, the invention may be embodied in a generic or specialized network management system with the claimed features fully integrated with the network management system.

In the preferred embodiment separate key periods are defined for each of the busy hours and periods before and after that are useful; an event either occurs in a key period or not. In another embodiment, only one key period is defined and the periods before and/or after the key period are considered by the fault management system as an extended key period. The event record will be modified, if the time of the event is within the retrieved key period or extended key period, to show that the event is within the retrieved key period or extended key period. The event and an indication that the event is within the retrieved key period or extended key period is displayed using the information in the modified event record. The extent of the extended key periods is defined in the definitions.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A system for managing a data processing network, wherein the network comprises a set of connected network devices and at least one network device generates an event record containing an identity of the generating network device and a timestamp indicating when the event was generated, the system comprising:
    means for retrieving the event record and identifying the network device that generated the event, wherein the event occurs in two or more key periods as defined by two or more performance timeframes, said system creating a key period association for each occurrence in the key period;
    means for retrieving a key period of use associated with the generating network device;
    means for modifying, if the time of the event is within the retrieved key period, the event record to show that the event is within the retrieved key period; and
    means for displaying, using information in the modified event record, the event and an indication that the event is within the retrieved key period.

2. The system of claim 1 wherein the key period of use associated with the generating network device is established with respect to the generating network device or a related device or a group of network devices, including the generating device or an associated device, by considering cumulative events in the generating network device or the related device or group of network devices or by considering cumulative performance metrics acquired directly from the network devices in the group.

3. The system of claim 1 wherein more than one type of key period is retrieved and the record is modified to show a type of key period including one or more of: a busy period; a pre-busy-period; a post-busy-period; and a foreign-busy-hour.

4. The system of claim 1 wherein key periods are adjacent or overlapping in a timeframe.

5. The system of claim 1 wherein the key period is primarily a period when a group of network devices has maximum or minimum key performance.

6. The system of claim 5 wherein key performance can be calculated as a function of an amount of event data generated by the group of network devices.

7. The system of claim 5 wherein the key performance can be calculated as a function of the performance of the group of network devices.

8. The system of claim 1 wherein the event record is modified if the time of the event is within the retrieved key period or an extension of the key period to show that the event is within the retrieved key period or the extension of the key period; and the event and an indication that the event is within the retrieved key period or extension of the key period is displayed using the information in the modified event record.

9. The system of claim 1 wherein key periods of same types or different types can be retrieved.

10. A computer program product comprising a non-transitory computer readable recording medium having computer readable code stored thereon for managing a data processing network, wherein the data processing network comprises a set of connected network devices and at least one network device generates an event record containing an identity of a generating network device and a timestamp indicating when an event was generated, said computer readable code which when loaded onto a computer system and executed performs the following steps:
    retrieving the event record and identifying the network device that generated the event;
    retrieving a key period of use associated with the generating network device, wherein the key period of use is a period when the at least one network device is most active calculated as a function of key performance indicators comprising an amount of event data generated by the at least one network device; performance of the at least one network device; and traffic volume through the at least one network device;
    modifying, if the time of the event is within the retrieved key period, the event record to show that the event is within the retrieved key period; and
    displaying, using information in the modified event record, the event and an indication that the event is within the retrieved key period.

11. The computer program product of claim 10 wherein the key period of use associated with the generating network device is established with respect to the generating network device or a related device or a group of network devices, including the generating device or an associated device, by considering cumulative events in the generating network device or the related device or group of network devices or by considering cumulative performance metrics acquired directly from the network devices in the group.

12. The computer program product of claim 10 wherein more than one type of key period is retrieved and the record is modified to show a type of key period including one or more of: a busy period; a pre-busy-period; a post-busy-period; and a foreign-busy-hour.

13. The computer program product of claim 10 wherein the key period further comprises
    a period adjacent or overlapping in a timeframe.

14. The computer program product of claim 10 wherein the event record is modified if the time of the event is within the retrieved key period or an extension of the key period to show that the event is within the retrieved key period or the extension of the key period; and the event and an indication that the event is within the retrieved key period or extension of the key period is displayed using the information in the modified event record.

15. The computer program product of claim 10 wherein key periods of a same type or different types are retrieved.

16. The computer program product of claim 10 wherein the key period further comprises a period when a group of network devices has maximum or minimum key performance.

17. The computer program product of claim 16 wherein the key performance is calculated based on a function of an amount of event data generated by the group of network devices.

18. The computer program product of claim 16 wherein key performance is calculated based on a function of a performance of a group of network devices.

* * * * *